United States Patent [19]

Sampayo

[11] Patent Number: 5,542,409
[45] Date of Patent: Aug. 6, 1996

[54] SOLAR CONCENTRATOR SYSTEM

[76] Inventor: Eduardo A. Sampayo, 11859 E. 209th St., Lakewood, Calif. 90715

[21] Appl. No.: 369,370

[22] Filed: Jan. 6, 1995

[51] Int. Cl.$^6$ ..................................................... F24J 2/38
[52] U.S. Cl. .................................... 126/606; 126/607
[58] Field of Search ................................... 126/576, 577, 126/600, 605, 606, 607

[56] References Cited

U.S. PATENT DOCUMENTS

| | | | |
|---|---|---|---|
| 1,951,404 | 3/1934 | Goddard | 126/607 |
| 4,173,397 | 11/1979 | Simpson | 350/295 |
| 4,293,192 | 10/1981 | Bronstein | 350/296 |

*Primary Examiner*—Carroll B. Dority

[57] ABSTRACT

A solar concentrator system, comprising a plurality of long metal foils with a reflective surface, longitudinally tensioned from both free ends by respective end moving frames with tensioning means, and supported by a plurality of uniformly spaced intermediate moving frames.

Each moving frame has a respective driving crank, secured to a common bushing, mounted on a horizontal shaft, said shaft being secured to a respective support pedestal, a plurality of said support pedestals being secured to a common transverse beam, forming a common support structure.

A solar concentrator module has a pair of end support structures with anchor means, and a plurality of uniformly spaced intermediate support structures with sliding means.

Each of said end and intermediate support structures has driving means for driving said moving frames, thus forming a plurality of individual support and driving units.

5 Claims, 5 Drawing Sheets

SOLAR CONCENTRATOR SYSTEM

BACKGROUND OF THE INVENTION

It is the object of the present invention to provide a new solar concentrator of simple construction, easy to operate and almost free of maintenance.

The system is adaptable to multiple use, such as solar thermal power plants, solar concentrators for collecting photovoltaic panels, solar heaters for industrial process, etc.

Solar thermal technology concentrates the sun's radiation using tracking mirrors onto a receiver where the solar energy is absorbed as heat and converted into electricity or incorporated into products as process heat. There are two primary solar thermal technologies: central receiver systems and linear receiver systems.

Current central receiver systems use fields of heliostats (two-axis tracking mirrors) to focus the sun's radiant energy onto a central receiver. The field of heliostats is the single most expensive part of such plants. Recent technologies have focused on the development of heliostats that use stretched-membrane reflectors in place of the more familiar glass mirrors. In such heliostats, the metal foils are stretched over both sides of a long-diameter metal ring. The reflector surface is a silvered-polymer film glued to the metal membrane.

The basic concept for the stretched-membrane mirror's design is that a metal foil, when placed in uniform tension, provides an excellent substrate for an optically reflective surface.

The present invention relates to the linear receiver technology, where line focus tracking reflectors concentrate sunlight onto receiver tubes or panels along their focus line. The linear focus allows to track the apparent movement of the sun with only one degree of freedom.

The reflectors are made of metal foils with a reflective surface, stressed in uniform tension. Each metal foil performs as a whole solar mirror, avoiding in this way longitudinal welding to each other.

There are some U.S. Patents, such as U.S. Pat. Nos. 4,293,192, 4,510,923, 4,316,448 and 4,173,397 that also show a variety of concentrator devices with flexible foils of a reflective material, tensioned by mechanical tensioning means. These patents include the use of frame structures that support the tensile stress of said flexible foils.

Generally, such frame structures would be expensive to fabricate, heavy and difficult to employ. For example, it is known that a metal foil must be placed in uniform, high tensile stress for providing a good optically reflective surface (i.e. 13,000 psi for stretched-membrane heliostats tested at Sandia National Laboratories); consequently, it can be appreciated that such support frames include a plurality of heavy and bulky support members in the direction in which the foil is stressed.

A heavy support structure practically offsets the apparent advantage of using metal foil mirrors. The fundamental objective of the present invention is directed to avoid the use of such longitudinal support structures for supporting the tensile stress of the metal foils.

The concentrator employs a plurality of small individual support structures, transverse to the longitudinal direction of the metal foils. Set in arrays, long metal foils with a reflective surface are longitudinally tensioned from both free ends by a pair of end support structures with tensioning means, and supported by a plurality of uniformly spaced intermediate support structures with sliding means.

The construction and assemble of the concentrator system allows for substantial economies of scale. Large reflective surfaces can be supported and driven by a plurality of identical support structures, without mechanical connection to one another.

SUMMARY

The solar concentrator system consists of a plurality of long metal foils with a reflective surface, longitudinally tensioned from both free ends by respective end moving frames with tensioning means, and supported by a plurality of uniformly spaced intermediate moving frames with sliding means, said metal foils forming an adequately taut and smooth substrate for the reflective film.

Each of said end moving frames with tensioning means has a support frame with a respective driving crank, secured to a common bushing, mounted on a horizontal shaft, said shaft being secured to a respective support pedestal, a plurality of said pedestals being secured to a common transverse beam, forming an end support structure with anchor means for securing said support structure to a foundation pylon.

Each of said intermediate moving frames with a respective driving crank are secured to a common bushing, mounted on a horizontal shaft, said shaft being secured to a respective support pedestal, a plurality of said pedestals being secured to a common transverse beam, forming an intermediate support structure with sliding means for sliding said support structure in the longitudinal direction of said metal foils.

Each of said end and intermediate support structures has driving means for driving said moving frames, thus forming a plurality of individual support and driving units.

BRIEF DESCRIPTION OF THE DRAWINGS

For a clear understanding of the object of the present invention, it has been illustrated in several drawings, in which the new solar concentrator is represented in the preferred embodiment of performance, in which.

In the different drawings the same reference numbers indicate equal or corresponding components or parts.

DETAILED DESCRIPTION OF THE INVENTION

In order that it may be easily understood, references have been made to the essential components that correspond to the operation of the system.

Figure 1:
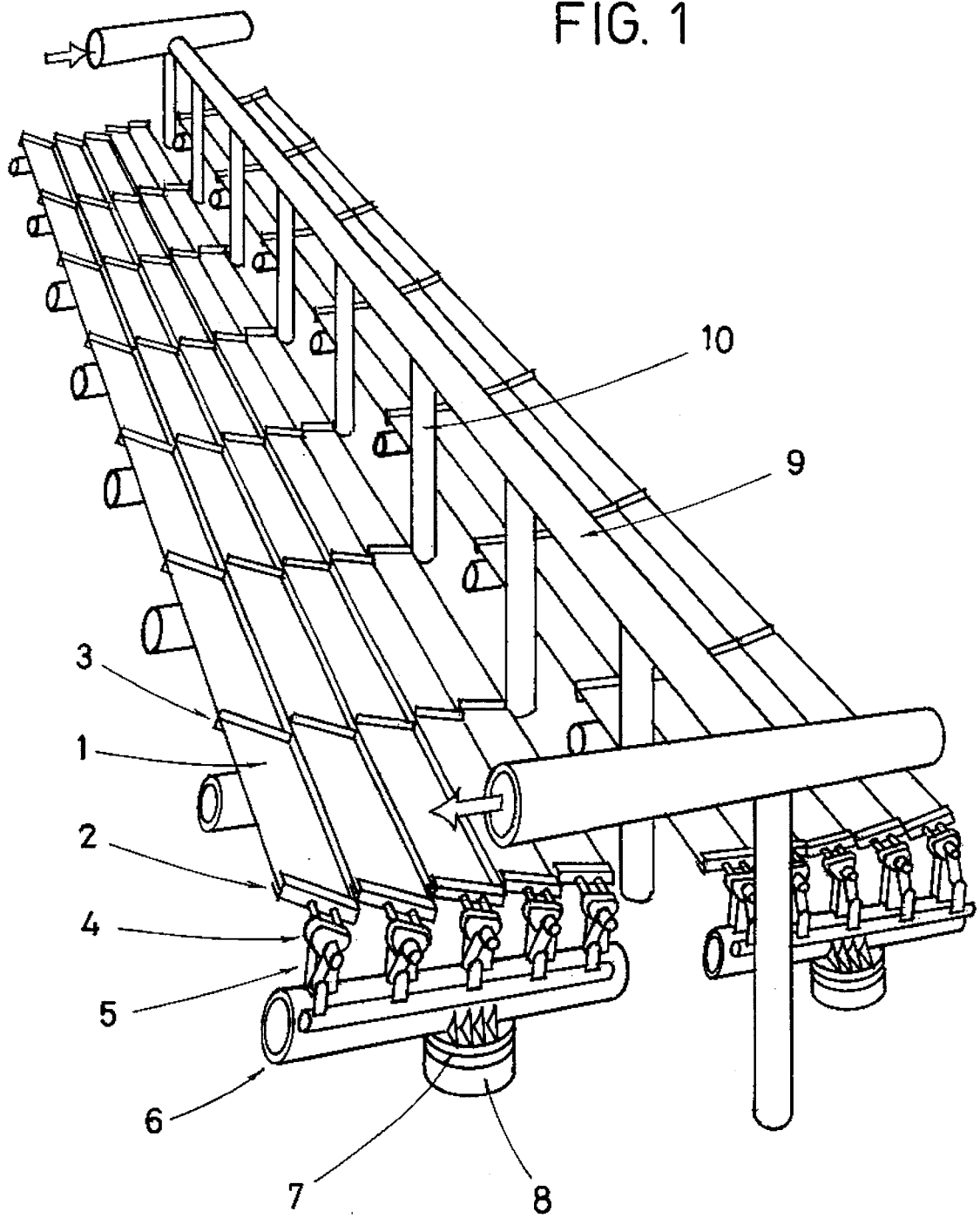
FIG. 1 is a general view of the solar concentrator system, comprising a pair of concentrator modules placed at both sides of a tubular receiver, which is located on the mirrors' focal line.

As may be seen in FIG. 1, a concentrator module is formed by a plurality of linear mirrors 1 placed at low height over the ground level; their axes are horizontal and parallel to one another. The term "linear" is linked to the mirror's shape, in which its length is many times larger than its width.

Each mirror is a metal foil with a reflective surface, adequately stressed and stretched from both free ends by a pair of end moving frames with tensioning means 2, and supported by a plurality of uniformly spaced intermediate moving frames 3; each of said end moving frames 2 has the respective support frame 4, mounted by moving support means on the support pedestal 5. A plurality of said support pedestals are secured to a common transverse beam 6, forming an end support structure. The transverse beam 6 has a central base plate 7 with anchor means for securing said support structure to a foundation pylon 8.

Since the receiver and collecting ducts form no specific part of the present invention, the details thereof are omitted in the interest of brevity. FIG. 1 shows a simplified tubular receiver 9 supported by a plurality of uniformly spaced columns 10. The solar radiation reflected by the mirrors strikes an absorbing wall of the receiver, heating the tube to high temperature. Meanwhile, the hot metal transmits the heat to a circulating working fluid, which transports the solar energy to the conversion process.

Figure 2:
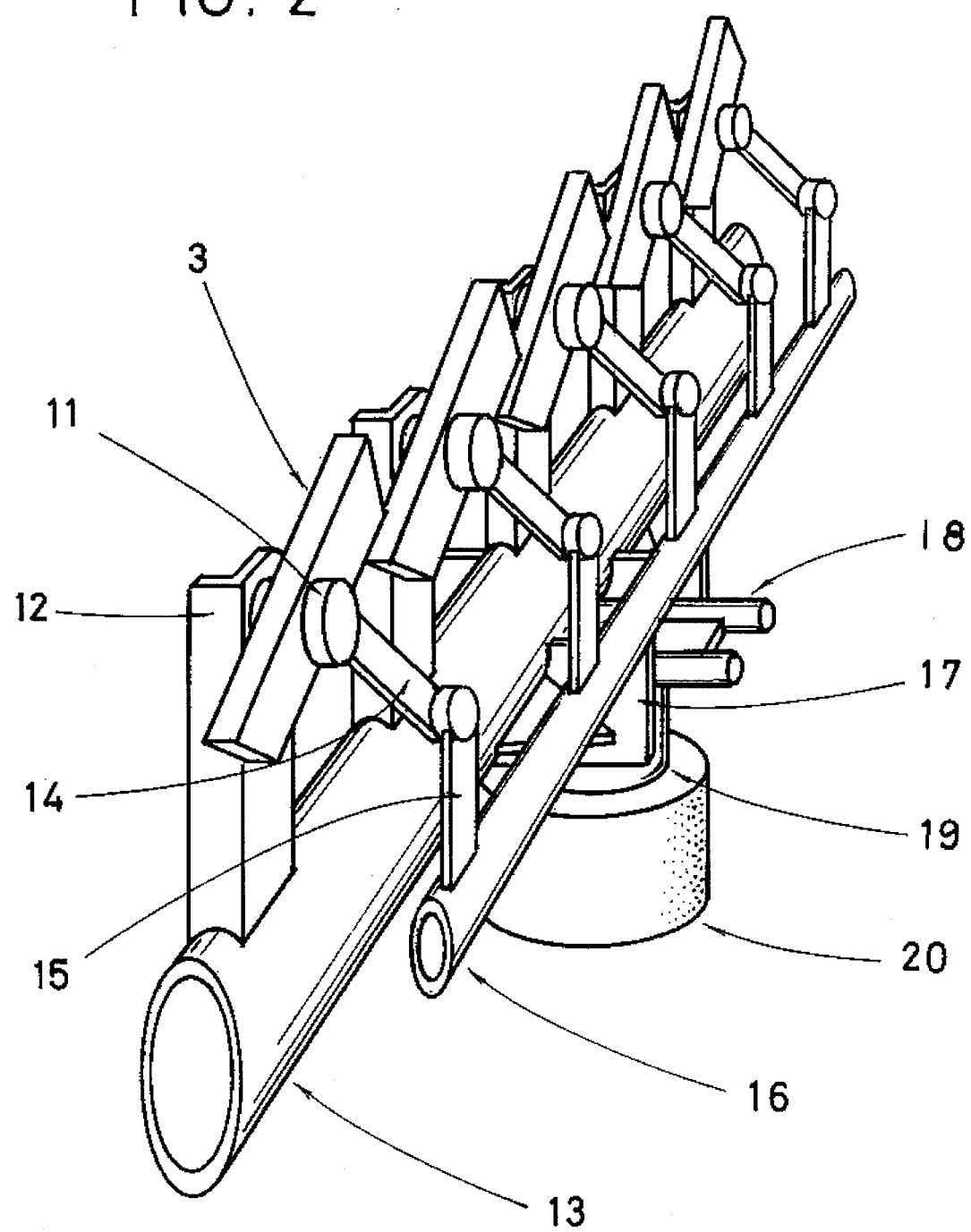
FIG. 2 is a perspective view of an intermediate support and driving unit, showing the array of intermediate moving frames with respective driving cranks, mounted by moving support means on the respective support pedestals, said pedestals being secured to a common transverse beam.

FIG. 2 shows an intermediate support and driving unit, comprising a plurality of moving frames 3 with respective driving cranks 14, secured to respective common bushings 11, each of said bushings 11 being mounted on the respective shaft 25 (FIG. 4), said shaft 25 being secured to the respective support pedestal 12, a plurality of said pedestals 12 being secured to a common support beam 13, transverse to the longitudinal direction of said metal foils. The support beam 13 has a pair of lower support members 17 with a plurality of guide wheels 28 (FIG. 3), mounted on a horizontal slideway 18, forming a sliding system adaptable to longitudinal displacement of the unit due to thermal expansion or contraction of the metal foils.

The slideway 18 is secured by anchor means to a vertical support member 19, embedded into the foundation pylon 20. FIG. 2 also shows the array of parallel driving cranks 14 articulating with pivoting means at pivot points on the respective vertical arms 15, said vertical arms 15 being secured to the common tracking bar 16.

Figure 3:
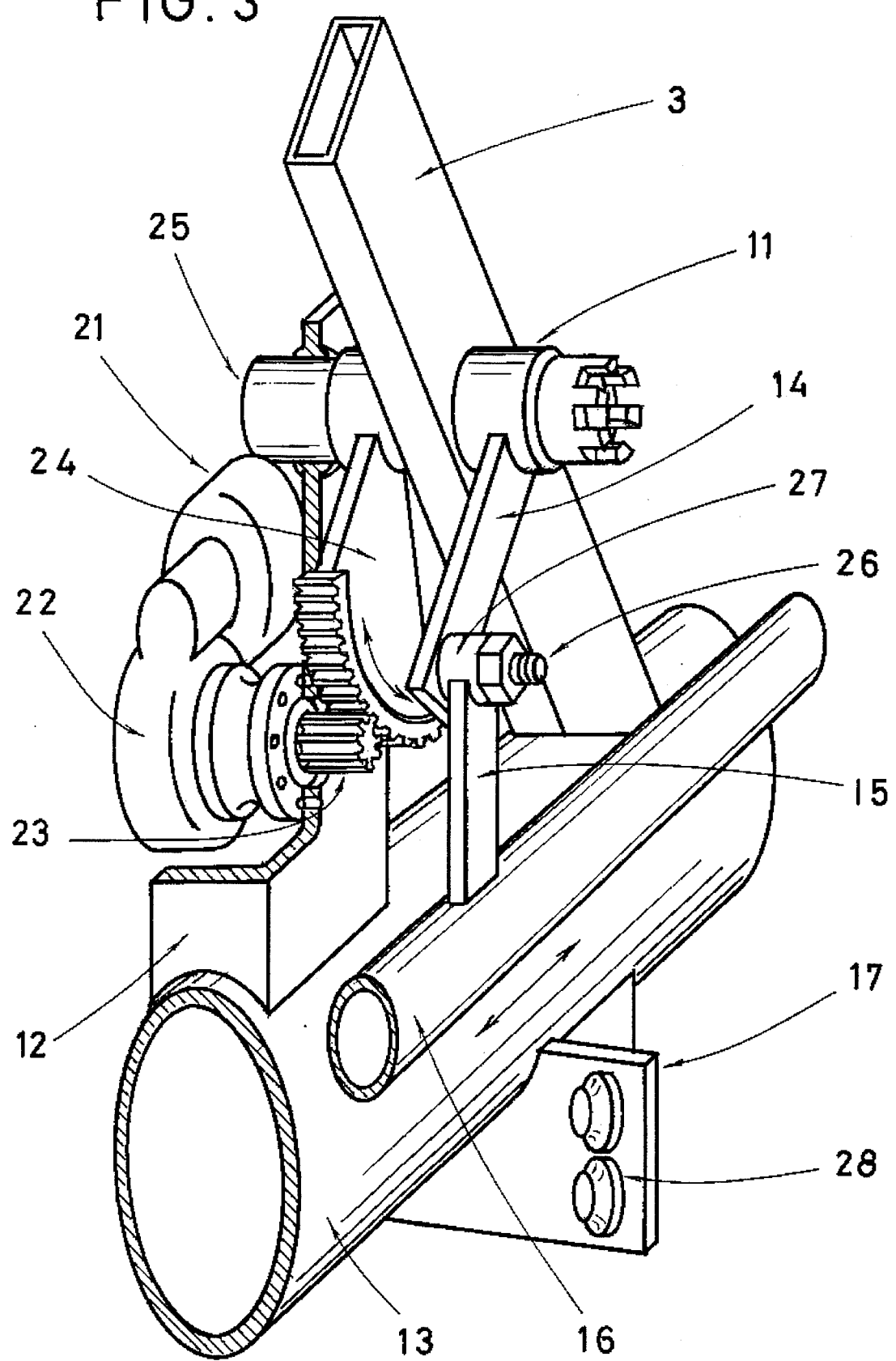
FIG. 3 illustrates the driving mechanism, coupled to the central moving frame of each support and driving unit, said moving frame with the respective driving crank being secured to a common bushing.

FIG. 3 shows the driving mechanism formed by the motor drive 21 with a worm-gear 22 driving the external gear 23. Said external gear 23 drives the gear 24, secured to the bushing 11. The driving crank 14 is also secured to said bushing 11.

A stud bolt 26 is secured to the free end of each of said driving cranks 14. Each of said vertical arms 15 has an upper bushing 27, said bushing 27 being mounted on said stud bolt 26, forming pivoting means between said driving cranks 14 and said vertical arms 15; said vertical arms 15 being secured to said common tracking bar 16, said driving cranks 14 moving in unison with the motion of said common tracking bar 16.

FIG. 3 also shows the lower support member 17 with a plurality of guide wheels 28, which are mounted on a common slideway 18.

Figure 4:
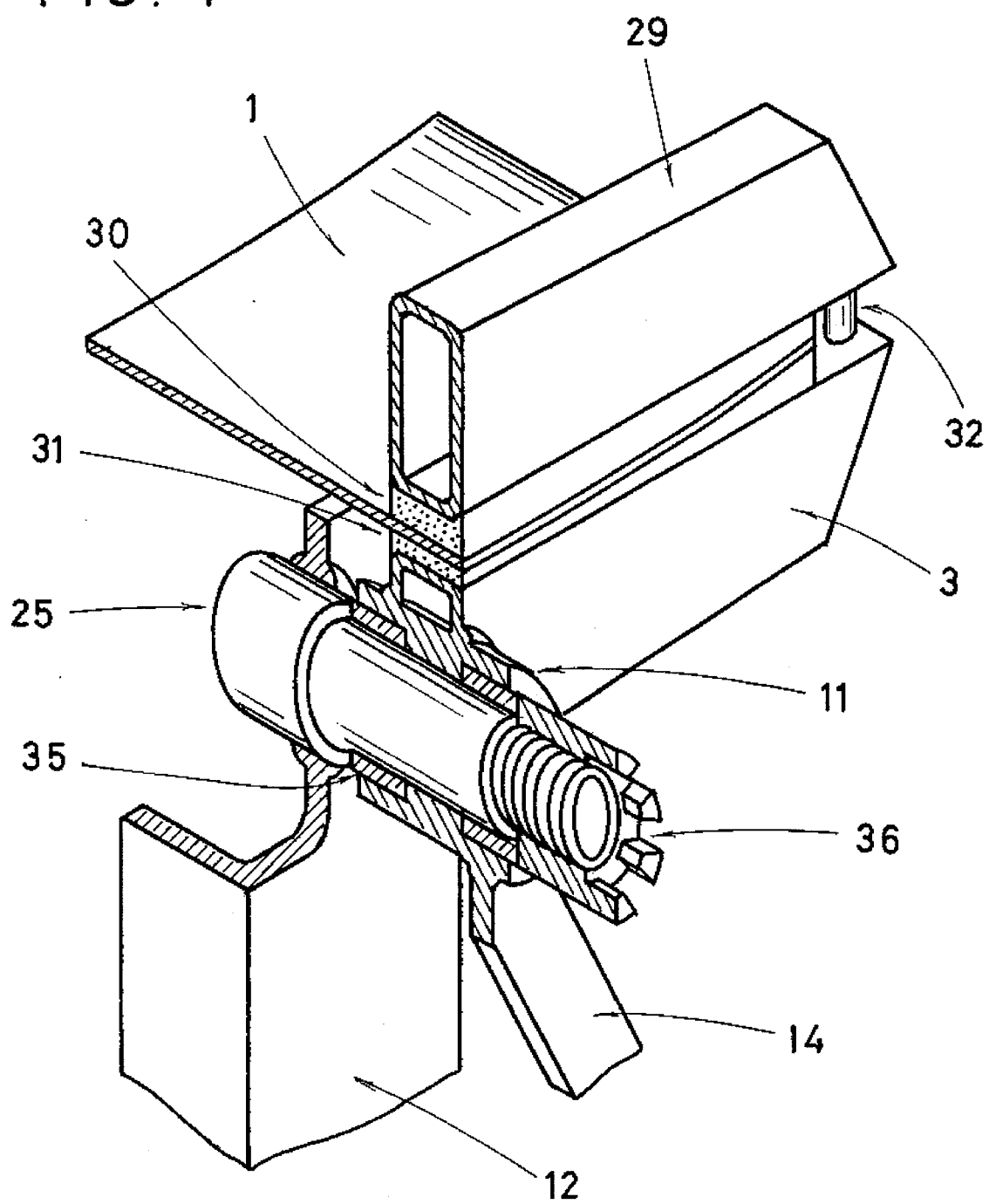
FIG. 4 illustrates a perspective and cross-sectional view of an intermediate frame assembly.

FIG. 4 shows a perspective and cross-sectional view of the intermediate frame assembly. Each mirror remains in its working position supported by a plurality of uniformly spaced intermediate moving frames 3.

Each moving frame 3 has an upper support member 29, and a pair of form members 30 and 31, made of a soft material, like rubber. The lower form member 31 has a slightly concave upper surface, and the upper form member 30 has a slightly convex lower surface, so that the metal foil 1 is secured between said upper and lower form members, forming a slightly concave reflective surface for improving the solar concentration on the receiver surface.

Each frame 3 has securing means, such as a pair of bolts 32 for securing the metal foil 1 to the respective moving frame 3.

Each moving frame 3 with the respective driving crank 14 are welded to the common bushing 11, within which are press-fitted a pair of self-lubricating bearings 35. The bushing 11 is mounted on the shaft 25. The shaft 25 is machined in the area where the bearings 35 are placed, and threaded in the free end, where the nut 36 is fitted on. The other end is welded to the support pedestal 12.

Figure 5:
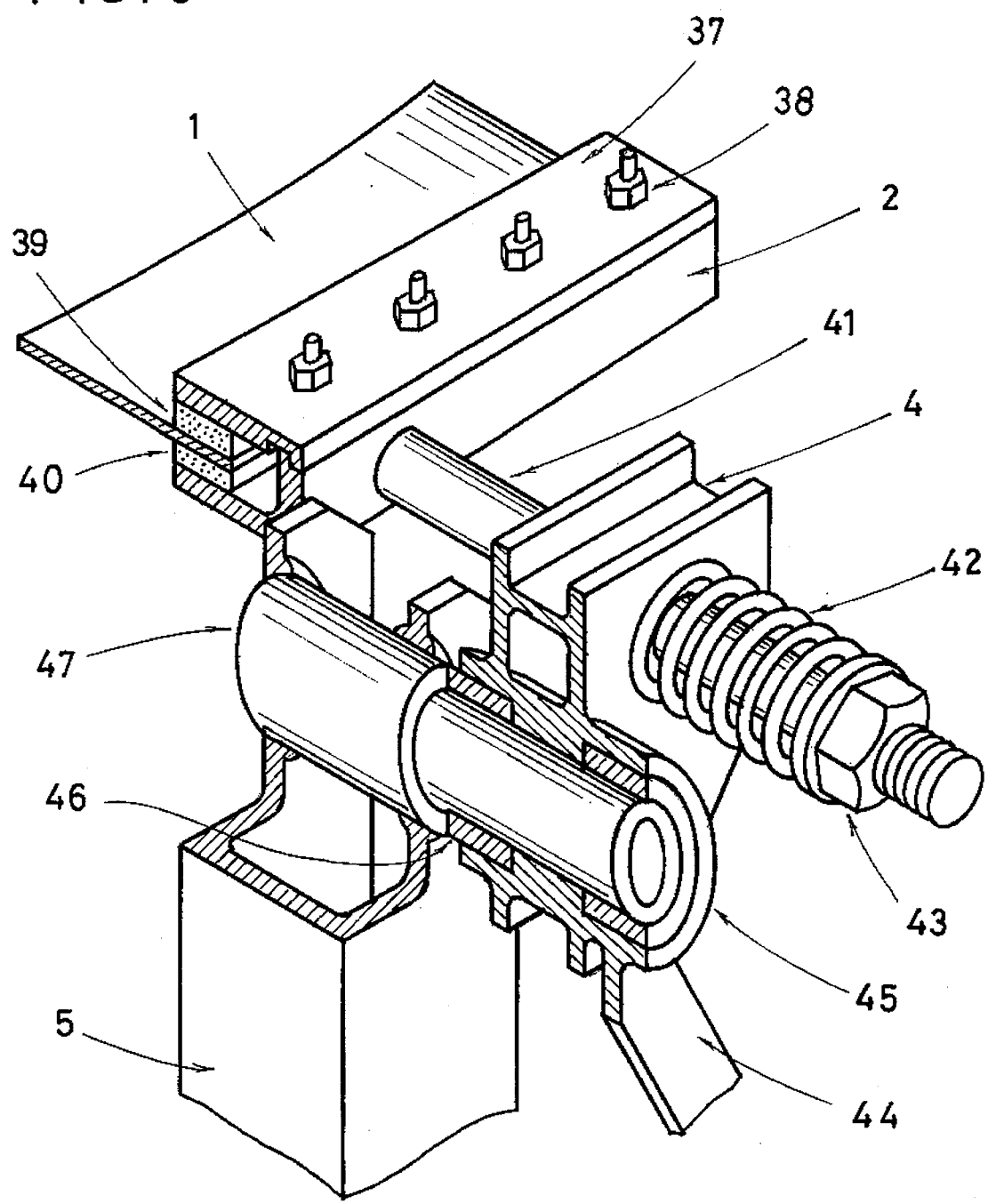
FIG. 5 illustrates a perspective and cross-sectional view of an end frame assembly with mechanical tensioning means.

FIG. 5 shows a perspective and cross-sectional view of the end frame assembly. The moving frame 2 has an upper support member 37 with securing means, such as a plurality of stud bolts and nuts 38. The metal foil 1 is secured between an upper form member 39 and a lower form member 40.

On the moving frame 2 are fitted up a pair of threaded bars 41, horizontal and parallel to the longitudinal direction of the mirror 1. Said bars 41 go through the support frame 4, the threaded ends having respective adjusting nuts 43 to allow the adjustment of the metal foil tensile stress through the respective coaxial springs 42, placed between said support frame 4 and said adjusting nuts 43.

Tensile stress of the metal foil will be only fixed during the mirrors' assembly, according to the ambient temperature at that moment, through the nuts 43. In winter, with low ambient temperature, the metal foil contracts, and the tension springs increase the foil tensile stress. By contrast, in summer the metal foil expands and the tensile stress decreases.

The design limits are determined by ensuring that in the summer the tensile stress is high enough to maintain an approximately plane and taut surface of the metal substrate for a good mirror performance. In winter, the tensile stress will be higher, but must be kept lower than the metal foil yield stress.

The support frame 4 and the respective driving crank 44 are welded to a common bushing 45, within which are press-fitted a pair of self-lubricating bearings 46. The bushing 45 is mounted on the shaft 47; the left bearing 46 acts as a thrust bearing, supporting the axial loads caused by the metal foil tensile stress. The shaft 47 is welded to the support pedestal 5, a plurality of said support pedestals being secured to a common transverse beam 6 (FIG. 1).

Having described and determined the basic principles of the present invention, and the way in which it will be put into practice, I hereby claim as my exclusive right and property:

1. A solar concentrator system, comprising a plurality of long metal foils with a reflective surface, each of said metal foils being longitudinally tensioned from both free ends by a pair of end moving frames with tensioning means, said metal foil being supported by a plurality of uniformly spaced intermediate moving frames; each of said end moving frames with tensioning means having a support frame with a respective driving crank, secured to a common bushing, said bushing being mounted on a horizontal shaft, said shaft being secured to a respective support pedestal, a plurality of said pedestals being secured to a common support beam, forming an end support structure, transverse to the longitudinal direction of said metal foils, having a central base plate with anchor means for securing said support structure to a foundation pylon; and each of said intermediate moving frames with a respective driving crank being secured to a common bushing, said bushing being mounted on a horizontal shaft, said shaft being secured to a respective support pedestal, a plurality of said pedestals being secured to a common support beam, forming an intermediate support structure, transverse to the longitudinal direction of said metal foils, having sliding means for sliding said support structure in the longitudinal direction of said metal foils; each of said end and intermediate support structures having driving means for driving said moving frames, thus forming a plurality of individual support and driving units.

2. A solar concentrator system, according to claim 1 each of said end moving frames with tensioning means having an upper support member with securing means for securing said support member to said moving frame, a pair of form members being located between said moving frame and said support member, said metal foil being firmly secured between said form members; said end moving frame also having at least a pair of threaded bars parallel to the longitudinal direction of said metal foil, said threaded bars going through said support frame, the threaded ends having respective adjusting nuts to allow the adjustment of the metal foil tensile stress, through respective coaxial springs placed between said support frame and said adjusting nuts.

3. A solar concentrator system, according to claim 1 each of said intermediate moving frames having an upper support member with securing means for securing said support member to said moving frame; a lower form member having a slightly concave upper surface being located between said moving frame and said metal foil, and an upper form member having a corresponding convex lower surface being located between said metal foil and said upper support member, said metal foil being firmly secured between said form members, forming a slightly concave reflective surface.

4. A solar concentrator system, according to claim 1 said sliding means comprising a pair of lower support members secured to said intermediate support structure, said support members having a plurality of guide wheels with respective support shafts, said support shafts being secured to said support members, said guide wheels being mounted on a horizontal slideway, having anchor means for securing said slideway to a foundation pylon; said intermediate support structure sliding on said horizontal slideway, to follow the thermal expansion or contraction of said metal foils.

5. A solar concentrator system, according to claim 1 said driving means comprising a driving mechanism secured by securing means to each of said end and intermediate support structures, said driving mechanism being directly coupled by mechanical means to one of said moving frames with said respective driving crank through said common bushing, a plurality of said driving cranks having the free ends connected by pivoting means at pivot points to respective vertical arms, said vertical arms being secured to a common tracking bar; said driving cranks moving in unison with the motion of said common tracking bar for driving said respective moving frames.

* * * * *